UNITED STATES PATENT OFFICE.

BENJAMIN DAWSON PORRITT, OF EDINBURGH, SCOTLAND, ASSIGNOR TO THE NORTH BRITISH RUBBER COMPANY, LIMITED, OF EDINBURGH, SCOTLAND.

VULCANIZATION OF RUBBER AND OTHER LIKE SUBSTANCES.

1,418,166.   Specification of Letters Patent.   Patented May 30, 1922.

No Drawing.   Application filed March 7, 1919. Serial No. 281,202.

*To all whom it may concern:*

Be it known that I, BENJAMIN DAWSON PORRITT, a subject of the King of the United Kingdom of Great Britain and Ireland, and resident of 62 Queen Street, Edinburgh, Scotland, chemist, have invented certain new and useful Improvements in Vulcanization of Rubber and other like Substances, of which the following is a specification.

This invention relates to the vulcanization of rubber or other like substances by sulphur and it has for its object to effect a reduction in the time and (or) in the temperature required for vulcanization.

It has been known for some time that the vulcanization of rubber by sulphur may be accelerated by the addition of small proportions of certain organic or inorganic substances of a basic character.

Hitherto no use has been made of the compounds formed by the interaction of strong alkalis or strongly basic substances with the nuclear monohydroxy derivatives of benzene or its analogues in which the hydrogen of the hydroxyl group is replaced by the metal or equivalent radicle. I have found that these substances may be employed with success for this purpose in the manufacture of rubber goods.

For example, in accordance with this invention, the addition of 2% by weight of anyhdrous sodium phenate to a rubber mixing consisting of 90 parts of rubber and 10 parts of sulphur will reduce the time of vulcanization at 40 lbs. steam pressure by more than 75%.

I do not, however, limit myself to the particulars given in the foregoing example which is merely typical of the general processes employed, and may be suitably varied or modified to meet particular requirements, and it is further to be understood that the compounds formed by other similar nuclear monohydroxy derivatives of benzene and its analogues as, for example, m- and p- cresol, B naphthol, etc., may be substituted for phenol and likewise that the electro-positive radicle named may be varied by the employment of other metals or compounds of a basic character.

Claims:

1. The method of accelerating vulcanization which consists in adding to the mixture to be vulcanized an anhydrous compound resulting from the interaction of strong alkali with the nuclear monohydroxy derivatives of benzene in which the hydrogen of the hydroxyl group is replaced by the radicle.

2. The method of accelerating vulcanization which consists in adding to the mixture to be vulcanized an anhydrous compound resulting from the interaction of strong alkali with the nuclear monohydroxy derivatives of the analogues of benzene in which the hydrogen of the hydroxyl group is replaced by the radicle.

3. The method of accelerating vulcanization which consists in adding to the mixture to be vulcanized an anhydrous compound resulting from the interaction of strongly basic substances with the nuclear monohydroxy derivatives of benzene in which the hydrogen of the hydroxyl group is replaced by the radicle.

4. The method of accelerating vulcanization which consists in adding to the mixture to be vulcanized an anhydrous compound resulting from the interaction of strongly basic substances with the nuclear monohydroxy derivatives of the analogues of benzene in which the hydrogen of the hydroxyl group is replaced by the radicle.

5. The method of accelerating vulcanization which consists in adding anhydrous sodium phenate to the mixture to be vulcanized.

6. The method of accelerating vulcanization which consists in adding two per cent by weight of anhydrous sodium phenate to a rubber mixing consisting of ninety parts of rubber and ten parts of sulphur.

BENJAMIN DAWSON PORRITT.

Witnesses:
 BERNARD DUNSTAN WILKINSON LUFF,
 ALBERT HILLIARD.